UNITED STATES PATENT OFFICE.

EMILE E. FUCICH, OF NEW ORLEANS, LOUISIANA, ASSIGNOR OF TWO-FIFTHS TO ARTHUR J. MESTIER AND ONE-FIFTH TO NISIDA LOUQUE, BOTH OF NEW ORLEANS, LOUISIANA.

CATTLE FOOD AND PROCESS FOR MAKING SAME.

1,244,847.     Specification of Letters Patent.     Patented Oct. 30, 1917.

No Drawing.     Application filed March 17, 1917. Serial No. 155,577.

*To all whom it may concern:*

Be it known that I, EMILE E. FUCICH, a citizen of the United States, residing at New Orleans, in the county of Orleans and State of Louisiana, have invented a Cattle Food and Process for Making Same, of which the following is a full and complete specification.

My invention is a preparation of food for cattle, horses, and other live-stock, and the principal object of the same is to provide a simple, inexpensive but practical process for preparing or manufacturing an edible cattle-food in which the principal ingredient or main part of the food compound consists of bagasse screenings treated in a certain manner to make it palatable and nutritious so that a nourishing food may be produced from material which at present is considered of little or no value.

It is well known that what is commonly known as "bagasse," or that part of the sugar cane which comes from the mill, is of little or no value as a food on account of the pith or fibrous substance it contains, and therefore this material along with the screenings have heretofore been either rejected as waste or used for fuel. On the other hand I have discovered that although the long fiber bagasse possesses little or no food-value the bagasse screenings when properly treated will produce an edible food that is both palatable and nutritious and readily consumed by cattle.

In carrying out my invention I take the bagasse screenings and subject the same to heat for a certain length of time or until the moisture has evaporated, this step of the process being preferably performed in a drying-room; the material is then placed in a vat or other receptacle and a small proportion of molasses added as a binder. The compound or product which results from this process of treating the bagasse screenings is rather fine, or of small particles, brought together or rendered slightly compact by the molasses, and therefore is readily and conveniently picked up and eaten by the cattle.

The improved cattle food mixture resulting from the process hereinbefore described is put up in bags or other containers, and may be fed to the cattle of itself or mixed with other standard foods, mixing well with oats and proving very effective in connection therewith.

The nutritious quality or food value of bagasse screenings treated in the manner stated I have found to be very good after thorough tests, and I have also found that cattle not only enjoy it but more readily improve in weight when it is made their chief diet. In view of the fact that heretofore bagasse screenings have been considered a waste-product of sugar mills the food can be prepared at very little expense.

It will be understood, of course, that any suitable means may be employed for drying out the bagasse screenings, but in practice the material should be stirred now and then to bring about uniform dryness.

Having thus described my invention, what I claim as new and desire to secure by Letters-Patent of the United States, is:—

1. The herein described process consisting in subjecting the screenings from bagasse to the action of heat until the moisture is evaporated, and then adding a small proportion of molasses as a binder.

2. A food product for cattle consisting of bagasse screenings mixed with molasses.

3. A food product for cattle, horses, &c., consisting of dried bagasse screenings and a small proportion of molasses to bind the material together.

EMILE E. FUCICH.